[50.]

G. A. BROWN.

BELT FASTENING

No. 118,785.

Patented Sep. 12, 1871.

ATTEST:
H. F. Eberts
Myron H. Church

INVENTOR:
George A. Brown,
per Attorney
Thos. S. Sprague

UNITED STATES PATENT OFFICE.

GEORGE A. BROWN, OF READING, MICHIGAN, ASSIGNOR TO HIMSELF AND EBENEZER L. KELLEY, OF SAME PLACE.

IMPROVEMENT IN BELT-FASTENINGS.

Specification forming part of Letters Patent No. 118,785, dated September 12, 1871.

*To all whom it may concern:*

Be it known that I, GEORGE A. BROWN, of Reading, in the county of Hillsdale and State of Michigan, have invented a new and useful Improvement in Belt-Fastenings; and I do declare that the following is a true and accurate description thereof, reference being had to the accompanying drawing and to the letters of reference marked thereon, and being a part of this specification, in which—

Figure 1:
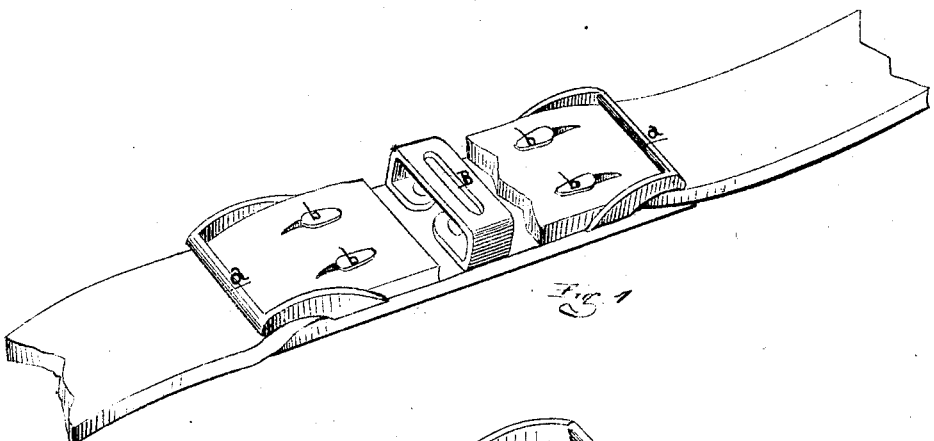
Figure 2:
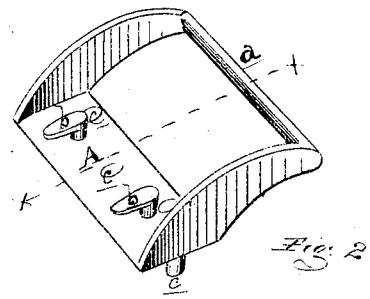

Figure 1 is a perspective view of a belt, the ends of which are joined to an intervening strip carrying two of my buckles. Fig. 2 is a perspective view of the buckle, and Fig. 3 is a cross-section of the same on the line $x\ x$ in Fig. 2.

Like letters refer to like parts in each figure.

This invention has for its object the construction of a simple and inexpensive device whereby the ends of belts used in transmitting motion may be securely joined together in such a manner that they may be easily shortened to take up their slack when necessary. The invention consists in the novel and peculiar construction of a buckle-plate, cast with a bail and studs, which is secured to the belt by rivets, and employed as hereinafter set forth.

Figure 3:
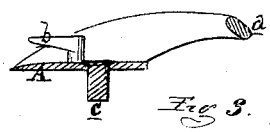

In the drawing, A represents a buckle-plate, which may be of malleable cast-iron or other metal, formed with a bail, $a$, and hooked studs $b$, projecting their hooks in a direction opposite the bail, as shown in Figs. 2 and 3. This buckle-plate I secure to one end of the belt by rivets $c$, so that the bail will point toward and terminate just above the end of the belt. In the other end of the belt I cut eyelets to pass the studs through, first introducing the belt end under the bale and then engaging its eyelets with the studs. To prevent the free end of the belt from turning outward or disengaging from the studs, I rivet a slide, B, on the belt back of the buckle, in which I insert the end of the belt.

It will readily be seen that all that is required to do to shorten the belt is to make fresh eyelets in the free end and repeat the operation just described. To lengthen or to splice the belt I make use of two buckles, one secured at either end of the intermediate splice, and secure the belt-ends thereto, as shown in Fig. 1.

What I claim as my invention, and desire to secure by Letters Patent, is—

The herein-described belt-fastening, composed of a buckle-plate, A, formed with a bail, $a$, and hook-studs $b$, secured to the belt by rivets $c$, in the manner and for the purpose set forth.

GEORGE A. BROWN.

Witnesses:
 H. P. PARMELEE,
 M. H. PARMELEE.